United States Patent
Fargier et al.

(10) Patent No.: US 11,296,992 B2
(45) Date of Patent: Apr. 5, 2022

(54) NETWORK INTERFACE FOR HOME-AUTOMATION APPARATUS, HOME-AUTOMATION SYSTEM FOR A BUILDING CONTAINING SUCH HOME-AUTOMATION APPARATUS AND BUILDING COMPRISING SUCH HOME-AUTOMATION SYSTEM

(71) Applicant: SOMFY ACTIVITES SA, Cluses (FR)

(72) Inventors: Sylvain Fargier, Cluses (FR); Vincent Vanderschaeve, Saint Jean De Tholome (FR)

(73) Assignee: SOMFY ACTIVITES SA, Cluses (FR)

(*) Notice: Subject to any disclaimer, the term of this patent is extended or adjusted under 35 U.S.C. 154(b) by 0 days.

(21) Appl. No.: 16/644,003

(22) PCT Filed: Sep. 3, 2018

(86) PCT No.: PCT/EP2018/073608
§ 371 (c)(1),
(2) Date: Mar. 3, 2020

(87) PCT Pub. No.: WO2019/043223
PCT Pub. Date: Mar. 7, 2019

(65) Prior Publication Data
US 2020/0274813 A1 Aug. 27, 2020

(30) Foreign Application Priority Data
Sep. 4, 2017 (FR) ...................................... 1758146

(51) Int. Cl.
*H04L 12/851* (2013.01)
*H04L 12/841* (2013.01)
(Continued)

(52) U.S. Cl.
CPC .............. *H04L 47/24* (2013.01); *H04L 47/28* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 5,963,560 A * | 10/1999 | Kalkunte | .......... | H04L 12/40143 370/448 |
| 2004/0100923 A1 * | 5/2004 | Yam | ....................... | H04W 36/14 370/328 |
| 2011/0213867 A1 * | 9/2011 | McCoy | ................... | H04L 69/18 709/223 |

OTHER PUBLICATIONS

International Search Report, PCT/EP2018/073609, dated Nov. 23, 2018.
French Search Report, FR 1758146, dated May 7, 2018.

* cited by examiner

*Primary Examiner* — Hong Shao
(74) *Attorney, Agent, or Firm* — Nixon & Vanderhye

(57) ABSTRACT

A method of managing traffic in a communication network is implemented by a network interface of a communicating element during the transmission of a message on a physical link of the network, the message including a transmission priority level. This method includes the steps of: detecting an internal state of a data link layer, as long as the internal state of the link layer does not allow the message to be sent immediately: waiting for the internal state of the link layer to reach a priority state equal to or lower than the transmission priority level, increasing the transmission priority level each time the internal state resumes a busy state signifying that a signal is present on the physical link during this wait time; sending the message when the internal state changes to a priority state equal to or lower than the transmission priority level.

20 Claims, 4 Drawing Sheets

(51) Int. Cl.
*H04L 29/08* (2006.01)
*H04L 47/24* (2022.01)
*H04L 47/28* (2022.01)
*H04L 69/324* (2022.01)

NETWORK INTERFACE FOR HOME-AUTOMATION APPARATUS, HOME-AUTOMATION SYSTEM FOR A BUILDING CONTAINING SUCH HOME-AUTOMATION APPARATUS AND BUILDING COMPRISING SUCH HOME-AUTOMATION SYSTEM

BACKGROUND OF THE INVENTION

Field of the Invention

This invention concerns a network interface for a home automation apparatus, a home automation system for a building containing the home automation apparatus, as well as a building comprising such a home automation system.

More generally, the invention relates to the field of building automation, both for commercial buildings and residential buildings, whether single- or multi-unit.

Description of the Related Art

There are numerous buildings equipped with controllable devices to carry out comfort and energy management functions such as heating, ventilation, and air condition, as well as lighting management and shutter monitoring, such as awnings or rolling shutters placed in front of windows of the building, or provide remote security functions by controlling locking systems (doors, locks). Automation refers to sets of rules governing the control of electrical devices by a programmable monitoring system in order to ensure greater comfort for the occupants of the building or to optimise energy consumption. These automated systems are controlled by a programmable monitoring system in order to ensure the comfort of the occupants of the building or to optimise energy consumption. These applications are referred to as 'building management', or, more generally as 'Building Automation Systems'. In the residential field, automation systems are more frequently referred to as 'home automation'. For the sake of simplicity, the term 'home automation' will be used below to refer both to residential and tertiary applications.

Typically, the devices of a single building are connected to a control unit, the function of which is to monitor the devices and control their operation. This connection is frequently made by connecting the equipment by means of dedicated wired links. For example, each device is directly connected to the control unit by means of one or more cables in a master-slave configuration.

However, this situation is not always satisfactory, because even the slightest modification of the home automation system or the operation of the devices necessitates rewiring the system, which is costly and complicated, requiring recourse to specialised installers.

In other known systems, this connection is made by connecting the devices to a common data bus, such as a multipoint bus that allows for bidirectional connections, e.g. RS485. This data bus is connected to the central unit so as to form a network that allows for the exchange of data between the devices and the control unit.

However, this situation does have its disadvantages.

On the one hand, the installation of the system is more complicated because the devices must each be manually configured in order to configure their operation and make them capable of communicating over the network. Thus, apart from the already-burdensome wiring operation, an additional step of network configuration is required, which itself necessitates the involvement of specialised installers.

Moreover, to a certain extent, this situation also offers limited flexibility, because any post-installation modification requires the network to be rewired, whether to add new devices or to modify their distribution within the building.

On the other hand, this known situation has limits in terms of the number of devices that can be included within the network. For example, the RS485 solutions currently used have limited addressing capabilities, and, in practice, only allow for a maximum of 255 individual devices to be connected to a single bus. This limit is prohibitive when equipping large buildings and/or buildings comprising a large number of devices to manage. Contemporary applications make it necessary to be able to manage ever greater numbers of devices, e.g. in the context of the Internet of Things (IoT) or 'smart' building management.

Moreover, the architecture of these known networks may result in increased latency times during communications between a device and the control unit. This is explained, in particular, by the fact that control is centralised, and the information transmitted by the devices must return to the bus in order to be centrally processed by the control unit. For some applications, excessive latency may result in dissatisfaction on the part of users wishing to use the device, or adversely affect the operation of the equipment. It is also possible to organise the devices of the building in communications networks.

The messages exchanged over the communications networks between the various devices are assigned a transmission priority level in order to avoid traffic congestion on the communications network. One problem arises when a message is sent over one portion of the communications network with a low transmission priority level, whilst a large number of messages with higher transmission priority levels are circulating or awaiting transmission over the same portion of the communications network. In fact, each message having a given transmission priority level must wait for all messages having a higher transmission priority level to be transmitted before accessing the network. Thus, a device may find itself in a situation where it cannot send any messages due to traffic saturation.

SUMMARY OF THE INVENTION

The invention seeks to address some or all of these issues by proposing a home automation system comprising an improved communications network that allows for simpler management of a large number of home automation devices within a building, whilst allowing for greater upgradeability and flexibility of use than known-art solutions.

In particular, one objective of the invention is to avoid messages having low transmission priority levels being blocked for excessive periods of time due to the transmission of messages having higher transmission priority levels.

To this end, the invention concerns a method for traffic management on a communications network, wherein the method is executed by a network interface of a communicating device when transmitting a message over a physical link of the communications network, wherein the network interface is adapted to implement a protocol stack, and wherein the steps of the method are executed in a data link layer of the protocol stack, wherein the message comprises a transmission priority level defined by a priority value, the lowest value of which indicates a maximum priority and the highest value of which indicates a minimum priority, wherein the method comprises the steps of:

detecting an internal status of the data link layer,
where the internal status of the data link layer does not allow the message to be sent immediately:
   waiting for a waiting period until the internal status of the data link layer transitions to a priority status lower than or equal to the priority level of the transmission,
   increasing the transmission priority level of the message of a unit each time the internal status of the physical link returns to an engaged state, meaning that a signal is present on the physical link during this waiting period;
   sending the message on the physical link when the internal status of the data link layer transitions to a priority status lower than or equal to the priority level of the transmission.

The invention makes it possible for a large number of home automation devices and a large number of network devices within the building to be managed over the communications network whilst providing increased flexibility in terms of installation and upgrading. Furthermore, the management of transmission priority levels of the messages sent by the home automation devices and/or the network at the level of each data bus makes it possible to limit the risk of a home automation device not being able send any messages due to saturation of the data bus.

According to aspects of the invention that are advantageous, but not mandatory, such a system may include one or more of the following features, taken alone or in any combination technically possible:

The data link layer successively enters various internal states:
   an engaged or receiving state during an engaged period, during which a carrier signal is present on the physical link;
   a buffer state following the end of the engaged state of the physical link, for a predetermined period,
   a maximum priority state,
   intermediate priority states,
   a minimum priority state,
wherein the duration of the priority states is predetermined or ends with a new engaged state.

The protocol stack comprises a physical layer, configured to manage physical signals carrying message data on the physical link, wherein the data link layer is configured to transfer data via the communications network interfaces, and a network layer to exchange and transmit messages within the communications network.

The data frame further contains data to be transmitted, which data encapsulate a network packet associated with a layer of the protocol stack, wherein the method comprises preparing the message to be sent, consisting of initialising the transmission priority value of the frame with a value equal to a reference priority value of the network packet, wherein this is a function of the type of communicating device that is transmitting the message or of a predefined criticality of the message.

The priority value is a numerical value, such as an integer, encoded in binary form within a dedicated field of a header of the message, wherein this numerical value is contained within a closed interval of 0-9.

The method comprises reinitialising the transmission priority value of the frame based on a reference priority value of the network packet following each transmission of the network by a network interface.

When sending the message over the physical link, when the internal status of the data link layer transitions to a priority status lower than or equal to the priority level, the transmission comprises a random wait time between the transition of the internal state of the data link layer to a priority status lower than or equal to the transmission priority level and sending the message.

In another aspect, the invention concerns a network interface for a communicating device that is part of a home automation system including a communications network having at least one physical link, wherein the physical link connects various communicating devices within the communications network, wherein the network interface is configured to execute the traffic management method as described above at each attempt to send a message over the physical link.

In another aspect, the invention concerns a communicating device comprising a network interface as described above.

In another aspect, the invention concerns a home automation system for a building including communicating devices according to the foregoing claim, distributed within the building and a communications network to which the communicating devices are connected by means of physical links, wherein the communications network allows the communicating devices to communicate in accordance with a predefined communications protocol.

According to aspects of the invention that are advantageous, but not mandatory, such a system may include one or more of the following features, taken alone or in any combination technically possible:

The communications network includes a plurality of subnets, wherein each subnet contains communicating devices that are interconnected within the subnet by means of physical links.

The communications protocol is the IP protocol.

The physical link is a wired multipoint data bus link.

In another aspect, the invention concerns a building equipped with a home automation system as described above, comprising communicating devices as described above.

This building may comprise several zones, wherein the home automation system is as described above, and wherein each subnet is associated with a zone of the building, wherein each subnet contains at least one of the communicating devices.

BRIEF DESCRIPTION OF THE DRAWINGS

The invention will be better understood, and other advantages thereof will become clearer, in the light of the following description of an embodiment of a home automation system for a building, provided by way of example only and by reference to the attached drawings, in which.

DESCRIPTION OF THE PREFERRED EMBODIMENTS

In the following, the term 'priority' refers to transmission priority.

Figure 1:
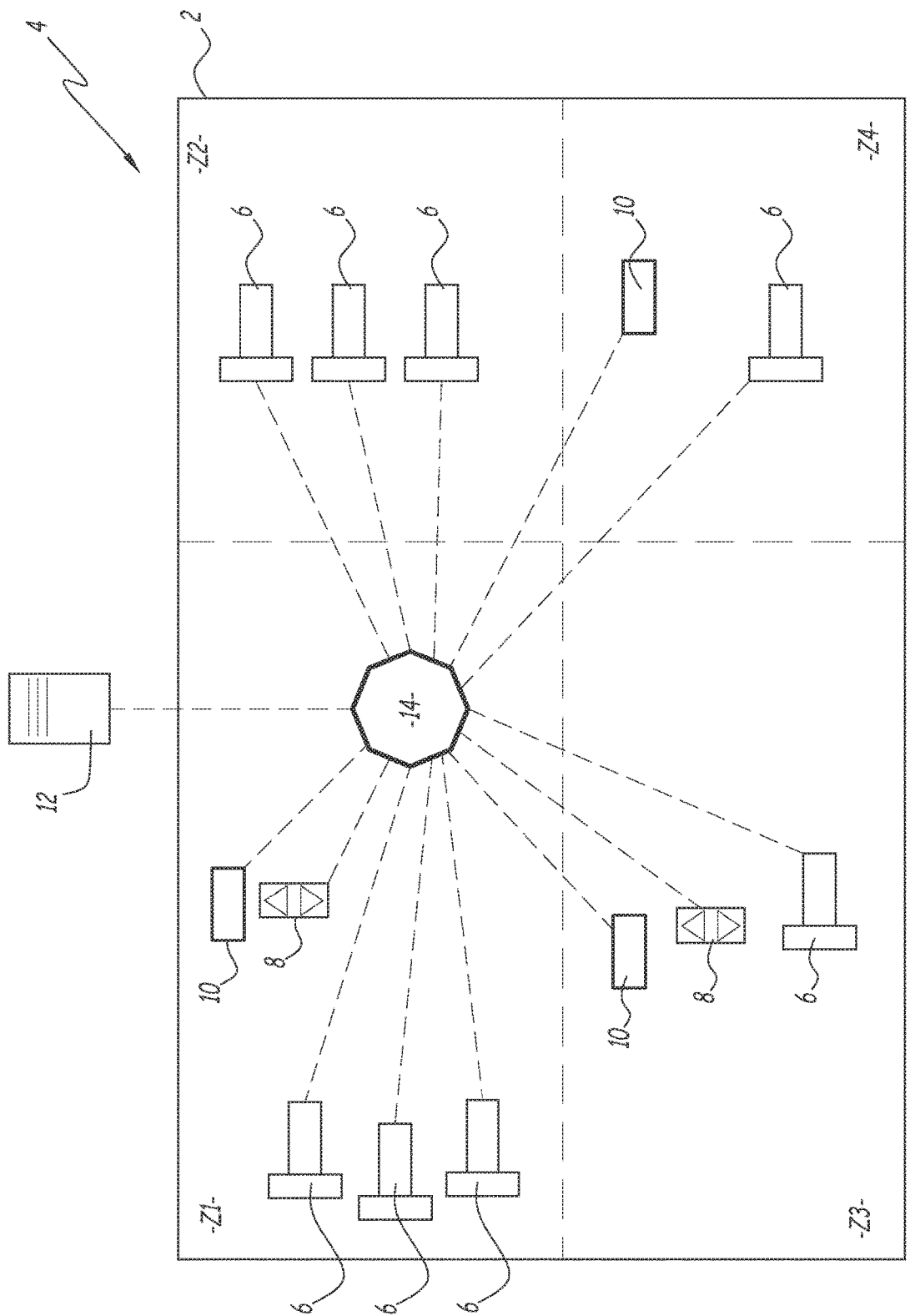
FIG. 1 is a schematic representation of a device comprising a home automation system according to the invention.

FIG. 1 shows a building 2, comprising several zones Z1, Z2, Z3, Z4. The building 2 is equipped with a home automation system 4 including a group of home automation devices distributed in the zones of the building 2, as well as a system for controlling these home automation devices.

Here, the home automation system 4 is meant to provide comfort and/or energy management functions for the building 2, such as heating, ventilation, and air conditioning, as well as functions such as lighting management, control of shutters, such as awnings or rolling shutters placed in front of the windows of the building 2, and/or security functions such as room monitoring and alarms.

The group of home automation devices comprises home automation devices such as controllable home automation devices 6, control points 8, and sensors 10.

In particular, the control system includes a programmable control unit 12 and a communications network 14 internal to the building 2, wherein the communications network 14 is arranged so as to allow the home automation devices of the home automation system 4 to communicate with the control unit 12. In the following, the home automation devices of the home automation system 4 that are connected to this communications network are said to 'belong to' the communications network 14.

Here, the home automation devices and the control system are connected to one or more electrical power sources (not shown) of the building 2.

The zones of the building 2 correspond to portions of the building 2 that are inside and/or outside the building and each intended to receive some of the home automation devices of the home automation system 4.

The building 2 may be a group of buildings or a residential building, or a commercial or industrial building, or any combination of such uses. In particular, it may be a block of flats or an individual house.

Thus, within the meaning of this invention, the term 'home automation' is not limited to purely domestic and residential uses.

For example, zones of the building 2 correspond to levels of the building 2, such as floors of basements. These zones may also be rooms or groups of rooms of the building 2, which may be separated from one another by means of walls; these rooms may be distributed within one or more levels of the building 2. These zones may also correspond to façades or parts of a façade, such as a part of a façade corresponding to a single floor.

These areas may be delimited independently of the physical structure of the building 2. For example, a single room of the building 2 may include several zones. Such zones may also be located outside the building 2, e.g. when they correspond to a façade or a portion of a façade of the building 2.

For example, these zones are defined during the design of the building 2 and/or the design and/or installation of the home automation system 4.

Preferably, the zones of the building 2 are distinct from one another. However, in one variant, the zones of the building 2 may overlap or be nested within one another.

In this example, only four zones, designated as Z1, Z2, Z3, and Z4, are defined in reference to the building 2. However, in practice, this number may be different. In particular, it is adapted depending on the configuration of the building 2 and the functions of the home automation system 4.

To simplify FIG. 1, the zones Z1, Z2, Z3, and Z4 are illustrated schematically within a single floor of the building 2.

Preferably, each controllable home automation device 6 includes an actuator that can be controlled by means of at least one control signal.

Here, the home automation devices 6 are illustrated as being identical. However, they may be different and have different functions within the home automation system 4.

For example, the actuator of the device 6 contains an electric motor that is coupled with a mechanical load and arranged so as to move and/or control an element of the building 2.

In one example, the mechanical load of the device 6 is a shutter, such as a panel, an awning, or an opaque curtain associated with at least one opening of the building 2, such as a window or a bay window. The movement of this shutter allows the amount of sunlight received by the building 2 through this opening.

In another example, the mechanical load of the device 6 is a compressor adapted to carry out an expansion-compression cycle of a coolant within the cooling system of the building 2, such as an air conditioner or a heat pump, in order to control the internal temperature of the building 2.

In yet another example, the mechanical load of the device 6 is a pump or fan intended to move a volume of fluid within the building 2, e.g. to aspirate or blow air within a ventilation system, or to circulate water or coolant within a dedicated conduit.

In one variant, the actuator of the device 6 may control an electrical switching device in order to turn on and off a light source, such as a battery of glow lamps or LED lamps, within the building 2.

The controllable home automation device 6 may also be a light, e.g. an interior or exterior light or a lighting control system, an alarm system, or a video camera, in particular a CCTV camera.

A control point 8 is intended to receive control instructions from a user of the building 2 in order to control, directly or indirectly, one or more of the controllable home automation devices 6 and/or to control the control unit 12.

To this end, each control point 8 here includes a human-machine interface (not shown), comprising data entry means, such as one or more switches and/or one or more pushbutton switches and/or one or more knobs and/or a touchscreen. The control point 8 may also include a connection interface to connect external control means, e.g. one or more individual switches arranged around the control point 8 and connected to it by means of a wired connection.

The human-machine interface of the control point 8 may also include display means, such as light indicators and/or an electronic screen, e.g. an LCD screen, to show the user information related to the operation of the home automation system 4 or instructions entered on the human-machine interface.

The control points 8 may take the form of a portable remote control associated with a fixed receiver or, in one variant, a fixed control terminal attached to a wall of the building 2.

Here, too, the control points 8 are shown as being identical, but they may be different, and be responsible for different functions within the home automation system 4.

Each sensor 10 is intended to convert one or more physical values related to the status of the building 2 or its environment into one or more signals proportional to this physical value. For example, this signal may be an electrical signal, a light signal, or a radio frequency (RF) signal. This signal may be transmitted by the sensor to one or more home automation devices and/or the control system, e.g. the control unit 12.

One or more sensors 10 maybe incorporated in a controllable home automation device 6, a control point 8, or the control unit 12. The home automation installation 4 may also comprise one or more sensors independent of these elements.

For example, the physical values measured by the sensors 10 are, by way of example only, a temperature, e.g. a temperature of a wall or the ambient air, a humidity level, a luminosity value, an ambient air pressure value, a consumption value, e.g. water, gas, or electricity consumption, the open/closed state of a shutter, the position of a shutter, e.g. on a window, motorised or otherwise, or the presence or absence of a user.

Here, too, the sensors 10 are shown as being identical, but they may be different from one another within the home automation system 4.

Generally, each home automation device comprises a network interface 40, which allows it to communicate over the network 14, and will be described in greater detail in the description.

By way of example only, in FIG. 1, the zone Z1 includes three controllable home automation devices 6, a control point 8, and a sensor 10. The zone Z2 includes three home automation devices 6. The zone Z3 includes a home automation device 6, a control point 8, and a sensor 10. The zone Z4 includes a home automation device 6 and a sensor 10.

For example, the three controllable home automation devices 6 of the zone Z2 are adapted to move shutters on openings of the building 2 that are arranged in this zone Z2. Continuing in this example, the controllable home automation devices 6 of the zone Z1 here are part of an air conditioning and cooling system for the air circulating in the zone Z1. Their operation is regulated by means of control commands received by the control point 8 and depending on a temperature measured by the sensor 10 located in this zone Z1.

Each home automation device of the home automation system 4, in particular the controllable home automation devices 6, the control points 8, and the sensors 10, is connected to the control unit 12 by means of the communications network 14, and, to this end, includes a network interface 40 to connect to this communications network 14. The control unit 12 also includes a network interface 40.

For example, each home automation device 6 receives control signals via the communications network 14. Each control point 8 transmits control orders received via the communications network 14. Each sensor 10 sends the information measured via the communications network 14.

Communications are carried out according to a given communications protocol.

For example, communications are carried out by exchanging messages, e.g. in the form of packets, with each of these messages containing a header that includes a destination of the message and useful data, e.g. a control order or a physical value measured by a sensor.

Preferably, the communications protocol used is IP (Internet Protocol), e.g. IPv6. In one variant, the communications protocol is the IPv4 protocol.

Figure 2:
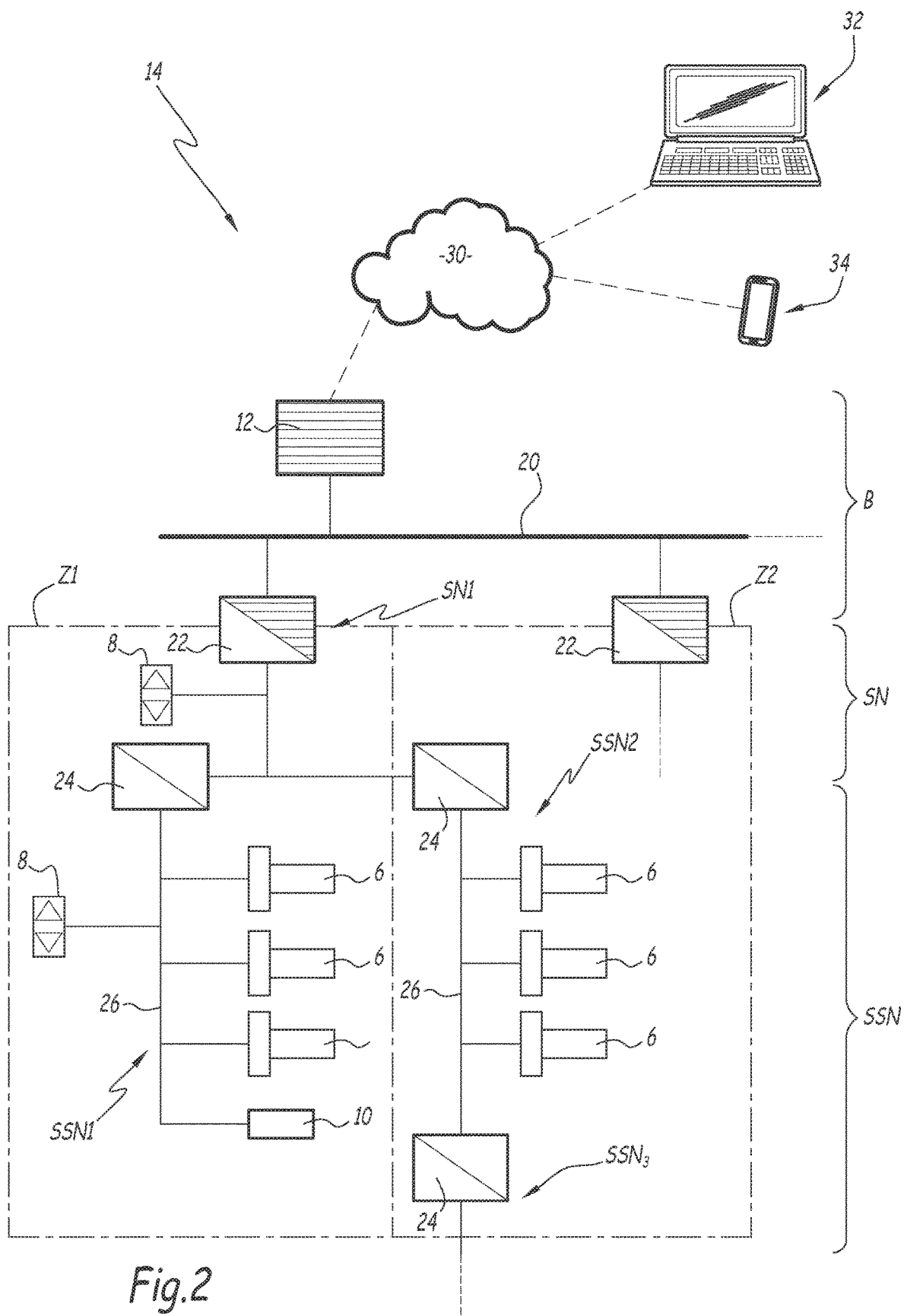
FIG. 2 is a schematic representation of a communications network of the home automation system of FIG. 1 to connect devices of the home automation system.

FIG. 2 shows the exemplary communications network 14 of FIG. 1 in greater detail. To facilitate the understanding of this FIG. 2, the home automation devices 6, 8, 10 associated with the zones Z3 and Z4 of the building 2 are not shown.

The communications network 14 is a hierarchical network having multiple hierarchical levels or 'ranks'. It includes a main network B, which comprises, in particular, a common data bus forming a backbone 20 to which the control unit 12 is connected.

The communications network 14 also includes at least one subnet, generically indicated by the reference 'SN'. This subnet includes a network device 22, 24 that is directly connected to the backbone 20 by means of a network interface 40 and forms the head of this subnet SN. It may be a network gateway 22 to interconnect two different parts of a network, e.g. different technologies. It may also be a router 24 when the main network B and the subnet SN are of the same type. Gateways and routers have similar functions, with the difference that the router does not convert the formats of data transmissions. These two network devices are intermediate elements of the communications network 14 providing for the routing of packets. Their role is to send packets from one network interface 40 to another according to a set of rules forming a routing table.

In the example of FIG. 2, two gateways 22 are connected to the backbone 20, thus forming two distinct subnets SN1 and SN2. Only one of these two subnets ('SN1') is described below.

In one variant, the number of subnets SN may be different.

The subnets SN are directly connected to the main network via the gateways, and have an associated first rank within the hierarchical network.

Each subnet SN contains at least one home automation device 6, 8, 10 of the home automation system 4, connected to the corresponding gateway 22 by means of a physical link 26 that is preferably wired.

The communications network 14 further includes sub-subnets having a lower rank than the subnets SN, and are generically indicated by the reference 'SSN'.

Each sub-subnet SSN includes a network device, advantageously a router 24, which connects it to a subnet SN or a sub-subnet having a higher rank in the hierarchy than itself. The network device 22, 24 forms the head of this sub-subnet SSN.

By reference to FIG. 2, if a rank n is associated with the subnet SN1, each sub-subnet SSN1 and SSN2 is associated with a rank n−1, and the sub-subnet SSN3 has a rank n−2.

Each router 24 at the head of a sub-subnet having the rank n−1 is connected to a gateway 22 by means of a physical link 26 that is preferably wired.

If the communications network 14 includes several hierarchical levels, each network device 22, 24 at the head of a sub-subnet having the rank n−k, where k is greater than or equal to 2, is connected to a router 24 having a higher rank n−k+1 by means of a physical link 26 that is preferably wired.

In one embodiment, the hierarchical network may comprise up to twelve levels of hierarchy, including that of the main network B.

Each sub-subnet SSN includes one or more home automation devices 6, 8, 10 connected to the corresponding router 24 by means of a physical link 26, with each device being connected to the physical link 26 using their respective network interfaces 40. The home automation devices connected via a single physical link 26 to a single router 24 are said here to be part of a single local subnet.

Preferably, the subnets Sn and each sub-subnet SSN having a lower rank than that of the subnet SN are each associated with a zone of the building 2.

A subnet SN and/or a sub-subnet SSN is said to be 'associated' with a zone Z1, Z2, Z3, Z4 of the building 2 when the home automation devices 6, 8, 10 belonging to this subnet are themselves associated with this zone, e.g. because they are physically located within this zone Z1, Z2, Z3, Z4 of the building 2.

The name and structure of the subnets SN and the sub-subnets SSN, as well as their association with the zones of the building 2, are preferably selected based on the configuration of the building 2 and the functions for which the home automation system 4 is responsible.

Preferably, the physical links 26 are RS485 or EIA-485 serial multipoint data buses.

Preferably, the physical link 26 connecting each network device 22, 24 with one another and connecting them to the home automation devices 6, 8, 10 is an RS485 serial multipoint data bus.

The use of an RS485 physical link 26 offers advantages within this communications network 14 because it makes it possible to use longer data buses, e.g. up to 1 km in length, without excessive deterioration of the quality of the signal circulating on it. The limit on the number of home automation devices 6, 8, 10 and/or network devices 22, 24 connected to a single physical link 26 is not prohibitive due to the hierarchical architecture, which allows for a large number of subnets to be connected.

Optionally, the control unit 12 is adapted to be connected to an external data network 30, e.g. the Internet, independently of the communications network 14.

In this way, the control unit 12 may communicate with a remote computer server connected to this external network 30, e.g. to send reports on the operating condition of the home automation system 4 for diagnostic purposes or to receive control instructions. The control unit 12 may also communicate via the external network 30 with one or more remote users, e.g., provided with a communications terminal such as a computer 32, a smartphone, a tablet computer, or any other equivalent device.

The communications network 14 is adapted to operate in accordance with a predefined communications protocol, e.g. the IP protocol, in order to provide for communications between the communicating devices of the home automation system 4 that are connected to the communications network 14.

In the preferred embodiment, the communications protocol used is the IPv6 protocol.

Here, this communications protocol is implemented using network interfaces 40 of the various home automation devices 6, 8, 10 and network devices 22, 24 of the home automation system 4, which are connected, in particular via their network interface 40, to the communications network 14.

In the following, the term 'communicating device' will be used to refer to the network devices 22, 24 and the communicating devices 6, 8, 10.

The routers 24 and the gateway(s) 22 include specific network interfaces. For example, these network interfaces each implement a protocol stack, i.e. a stack of protocol layers, with each protocol layer supported by those below it in order to provide additional functionality.

Figure 3:
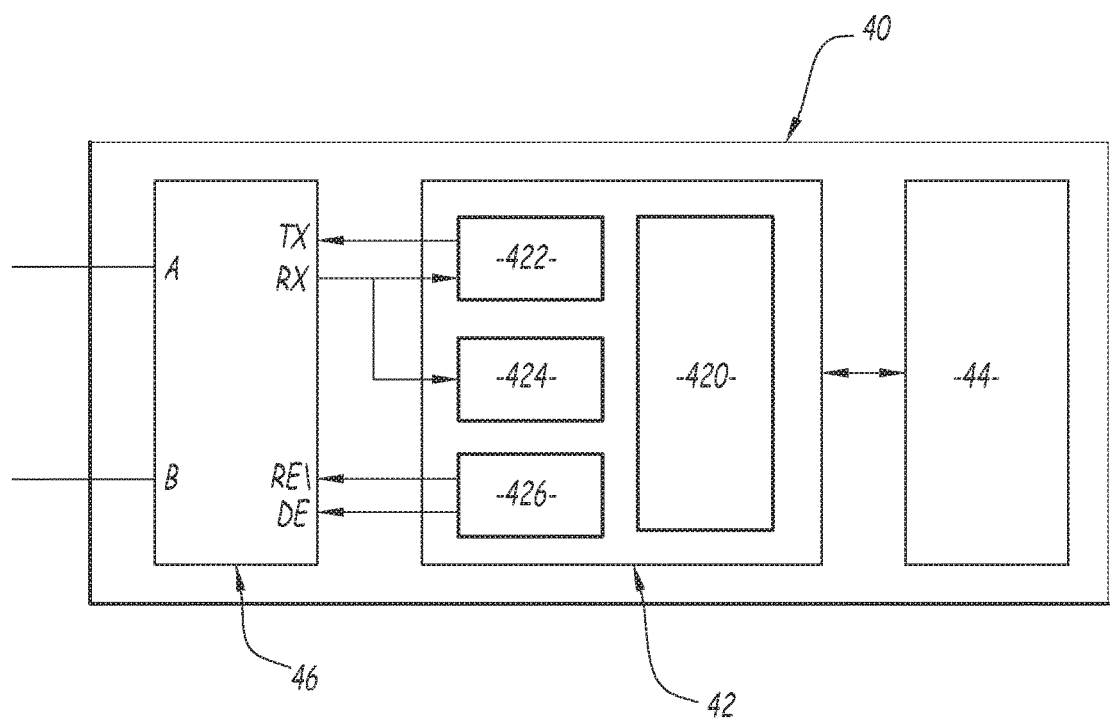
FIG. 3 is a schematic representation of a network interface used in devices of the home automation system belonging to the communications network of FIG. 2.

FIG. 3 is a schematic representation of the network interface of a communicating device. The network interface of a communicating device serves to connect this communicating device to one or more communication networks. It also allows it to communicate with the other communicating devices of the network(s) to which it is connected.

As shown in FIG. 3, each network interface 40 includes a network controller 42, a memory 44, and a transceiver 46; here, the transceiver 46 is provided with a connector that is arranged so as to physically connect the transceiver 46 to a physical layer of the communications network 14.

In this example, the physical layer of the communications network 14 partially consists of physical links 26.

The network controller 42 includes a computer, e.g. one or more processors, microprocessors, or any other equivalent device, programmed to process the data passing through the communications network 14 and the connector of the transceiver 46.

For example, the network controller 42 is programmed to automatically process the data received by the transceiver 46 that are intended for the network interface 40. The processing may consist, e.g., of extracting and decoding the content of packets received over the network interface and/or transmitting this content to the home automation equipment to which it is associated.

Additionally, the network controller 42 is programmed to automatically prepare the data transmitted by the home automation device with which it is associated in order to send them to one or more home automation devices connected to the communications network 14.

Lastly, the network controller 42 is adapted to carry out the program code instructions that allow for the execution of the steps of the network address configuration method according to the invention.

The RS485 data buses used here, in particular, to form the physical link 26, each include a pair of conductive wires, which are preferably twisted. To transmit these data on this bus, a carrier signal is transmitted, e.g., in the form of electrical voltage between this pair of conductive wires; this voltage may take on predefined values so as to encode information, e.g. in binary format. The form of the carrier signal is defined, e.g., by standard TIA/EIA-485-A.

In this example, the link 26 is a bidirectional 'half-duplex' link. In this example, the controller 42 further includes a universal asynchronous receiver/transmitter (UART), a unit 424 for detecting a signal on the network 26, and a unit 426 for controlling the transceiver 46.

The module 422 is connected to the transceiver 46 via a data transmission line TX and a data receiving line RX. The unit 424 is connected to the transceiver 46 via the data receiving line RX, which allows it to detect the presence of a carrier signal on the bus 26. The unit 426 is connected to the transceiver 46 via command lines RE\ and DE. The modules 422, 424, and 426 are connected to the unit 420 in order to exchange data with it. The module 46 transmits the data it receives from the transmission line TX to the link 26, and transmits the data it receives from the link 26 to the receiving line RX after decoding them. For example, the unit 424 is connected to generate an interruption of the computer 420 if it detects a signal transiting the receiving line RX ('edge-triggered interrupt').

In one variant, if the link 26 is not an RS485 link, the interface 40, and, in particular, the module 46 are adapted accordingly.

Here, the memory 44 contains a network address 50, part of a network address, or at least an identifier (not shown), that allows for unique identification of the network interface 40 on the communications network 14, and thus identifying the corresponding home automation device on the communications network 14. Here, the network interface 40 is compatible with the IPv6 standard, i.e. it is suited to implement the network protocol IPv6.

Additionally, the memory 44 advantageously contains executable program code instructions to carry out the aforementioned functions of the network controller 42.

Figure 4:
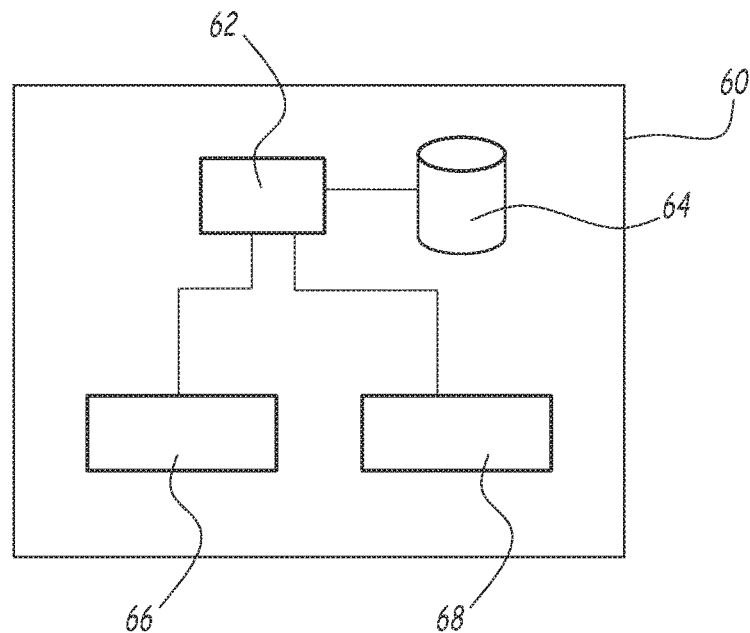
FIG. 4 is a schematic representation of a network device used in the communications network of FIG. 2.

FIG. 4 is a schematic representation of a generic network device 60 for use on the communications network 14. The generic network device 60 corresponds, e.g., to a gateway 22 or a router 24.

This network device 60 includes a programmable calculation device 62 including one or more processors, a memory 64, a first network interface 66, and a second network interface 68. The first network interface 66 is intended, e.g., for connection to a first sub-subnet, whilst the second network interface 68 is intended for connection to a second sub-subnet having a lower rank than the first sub-subnet. For example, the first and second network interfaces 66, 68 are each physically similar to the interface 40.

Each network device 60 includes at least one network address 50. In particular, each network interface 66, 68 of the network device 60 is associated with a network address 50, which will be described in greater detail below.

The programmable device 62 is adapted to carry out the program code instructions that allow for the execution of the steps of the network address configuration method according to the invention. For example, these program code instructions may be stored in the memory 64 of the network device.

The programmable device 62 is also programmed to provide for routing of the data packets arriving from the part of the network associated with one or the other of the first and second network interfaces 66, 68 to a part of the communications network 14 connected to the other network interface 66, 68 depending on the destination of the data packets. To this end, the device 60 here includes a routing table, e.g. one recorded within the memory 64. This routing table contains the list of all known routes of the communications network 14.

For example, in the embodiment of FIG. 2, in the case of a router 24, the first and second network interfaces 66, 68 here are compatible with the RS485 data buses.

A gateway 22 operates similarly to the network equipment 60 described above, except that, here, one of the two network interfaces 66, 68 is connected to the backbone 20.

In one variant, a network device 60 has a network interface 66 forming an uplink to a network device at a higher hierarchical level than the network equipment 60 and several interfaces 68 forming downlinks to network devices at lower hierarchical levels than the network equipment 60.

The communications protocol used by the communications network 14 allows the messages exchanged between the elements of the home automation system 4 to be addressed.

For example, when a first communicating device of the home automation system 4, e.g. a control point 8, must send data to a second communicating device of the home automation system 4, e.g. a controllable home automation device 6, the first communicating device ('source') will generate a message containing the data to be sent and the address of the second communicating device ('destination'). Thus, the message is routed within the communications network 14 from the source device until it reaches the destination device(s).

More specifically, a message exchanged between various communicating devices of the network that belong to the same local subnet or the same local sub-subnet passes through the physical link 26 to which the communicating devices of the network are connected. A message exchanged between communicating devices of the network that do not belong to the same local subnet or the same local sub-subnet is routed by means of the router 24 at the head of the local subnet to which the source device is connected, which redirects it, in some cases via network devices 22 and the backbone 20, to the sub-subnet to which each destination device is connected.

Each network device 22, 24 and each communicating device 6, 8, 10 of the communications network 14 has at least one network interface 40 having a unique network address 50.

In the following, the network address 50 of the network interface 40 of a communicating device will be treated as the network address 50 of the communicating device.

More specifically, in this example, the network protocol used within the communications network 14, and, in particular, implemented by the network interfaces 40 of the communicating devices includes several interconnected protocol layers. These protocol layers are each implemented by the protocol stack of each network interface 40 by means of software and/or hardware, in particular by means of the network controller 42.

For example, this network protocol includes the following in low or hardware layers:
 a physical layer L1, configured to manage the physical signals carrying data on the physical link 26,
 a data link layer L2, configured to transfer data between the nodes via the supports of the communications network, and
 a network layer L3, which exchanges and transmits messages within the communications network 14.

Here, the data link layer L2 contains two sublayers: a logical link control (LLC) sublayer and a media access control (MAC) sublayer.

For example, when a node of the communications network sends data over the physical link 26 to another node of the communications network 14, a message is automatically successively generated at each of these layers by the corresponding network interface 40.

By way of example, a network packet is generated on the network layer L3, with this packet containing the data to be sent as well as a header that includes, in particular, a destination network address identifying the destination(s) of the message within the communications network 14. Here, this header includes a reference priority value TC that defines the priority of the data packet to be transmitted. Advantageously, the reference priority value of the message is selected based on the type of communicating device that is associated with this interface and is transmitting the message. For example, the messages transmitted by a control point 8, by default, have a higher reference priority level than the priority level of messages transmitted by a sensor 10 or a controllable home automation device 6. In one variant, a single home automation device may transmit messages having different reference priority levels depending on the nature of the message. This may be the case, for example, when a controllable home automation device 6 sends an alarm message indicating a critical malfunction, or a sensor 10 measures a physical value exceeding an alarm threshold, as is the case with a fire detector or a temperature sensor. In these examples, the reference priority level may be maximum. However, other conventions are also possible.

Here, this reference priority value is a numerical value, e.g. an integer, encoded in binary form within a dedicated field of the header.

For example, in the IPv6 protocol, the header of each packet includes a 'traffic class' field containing the reference priority value TC.

Then, a data frame is generated on the data link layer L2, which frame encapsulates the packet previously generated. This frame contains a header including data related to the processing of the frame, such as a communications protocol version number, a frame length indicator, or a physical MAC address of the corresponding network interface 40, or a checksum, or any other error detection code. In one variant, this error detection code may be placed in a trailer of the frame. A priority value PRIO is associated with this frame, which is initialised from the reference priority value TC. Each time the message is routed within the communications network by a network device, the priority of the frame is reinitialized based on the reference value.

Then, on the physical layer L1, this frame is encoded within a physical signal, such as the aforementioned carrier signal, in order to transmit it on the physical link 26.

When this physical signal is received by a corresponding interface 40 of another communicating device 6, 8, 10, 22, 24 of the communications network 14, a frame is reconstructed from the physical signal received from the physical link 26, and its integrity may be verified. The packet is reconstructed based on the data contained in the frame; then, the packet is routed within the communications network through successive steps of transmission/receipt that are carried out analogously.

Here, the MAC sublayer is configured to implement access control for the physical layer 26 in order to avoid collisions between the data transmitted by different communicating devices within a single subnet. In other words, two nodes connected to a single physical layer 26 must not transmit data at the same time on this physical link 26.

For example, the data link layer implements a CSMA/CA (Carrier Sense Multiple Access with Collision Avoidance) access control protocol, which is specifically modified to take into account the priority value of the data frames, as explained below.

To this end, the network interface 40 of the communicating devices is configured here to verify an internal state of the physical layer 26 and manage the transmission of data depending on this internal state of the physical line.

Additionally, the access control is carried out depending on the priority level of the messages circulating on the physical layer 26.

For example, each data frame generated by the data link layer L2 is associated with a value representing a priority level.

As with the reference priority value TC, this priority value here is a numerical value, e.g. an integer, encoded in binary form within a dedicated field of the header of the data frame.

Figure 5:
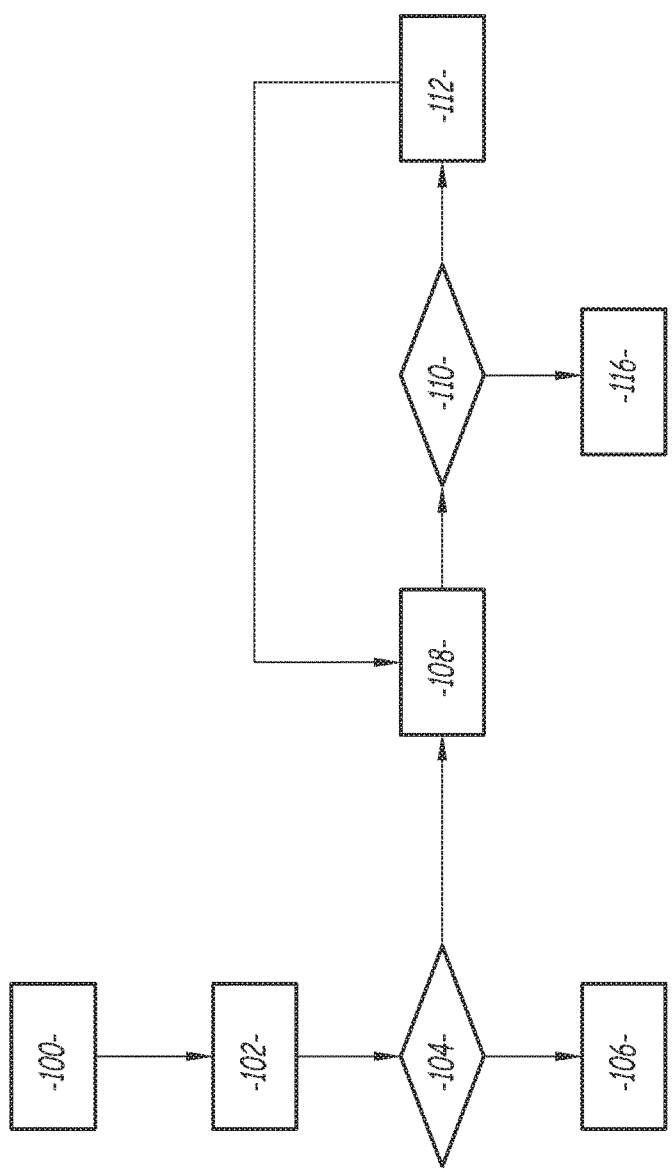
FIG. 5 is a flowchart of a method for transmitting a message over a data bus of the network by a network device of the system of FIG. 1.

For example, this numerical value is included within a closed interval from 0-9, with these values indicating a decreasing priority level; the lowest value indicates a maximum priority level, and the highest value indicates a minimum priority level. With this convention, an increase in the priority value lowers the priority of the message, whilst a decrease in the priority value increases the priority of the message. In one variant, other conventions are possible. Preferably, as explained below, the priority value of the data frame is initially chosen during the construction of the frame by the transmitting node of the network to be equal to the reference priority value associated with the corresponding packet, to which a unit is added. The priority of the frame thus cannot be created with maximum priority, because this is reserved to the network's congestion management. FIG. 5 shows an example of the operation of the method for managing access by a communicating device to the physical layer 26 via the network interface 40 when transmitting a message. For example, the access management method is automatically executed by the network controller 42, e.g. by means of executable program code instructions stored in the memory 44.

Here, this access management method is executed independently by the network interface 40 of each of the nodes connected to a single physical link 26, here by each of the home automation devices 6, 8, 10 connected to this physical link 26 as well as the network devices 22, 24 connected to this physical link 26, and in particular from the data link layer L2 of the communications protocol.

In practice, the data link layer successively enters various internal states:
- an engaged or receiving state during an engaged period, during which a carrier signal from a node is present on the physical link; The duration of this receiving state corresponds to the duration of the transmission of the signal.
- a buffer state ('guard time') following the end of the engaged state of the physical link, for a predetermined period GT,
- a maximum priority state having a predetermined duration,
- successive intermediate priority states, each of which has a predetermined duration.
- A minimum priority state, the duration of which ends with a new engaged state.

In a step 100, initially, the network interface 40 automatically prepares the message to be sent, here: the frame to be sent. This preparation includes assembling the frame by constructing the header, which is then concatenated with the data to be sent, which, in turn, encapsulate the content of the corresponding packet. The priority value is then initialised based on the reference priority value.

Then, in a step 102, the message is ready to be sent. For example, it temporarily resides in the memory 44. Thus, the message remains in a waiting state and is not sent at this stage.

Then, an attempt is made to send the message.

Thus, in a step 104, if the internal state of the data link layer is at a priority level lower than or equal to the priority level of the message, it is immediately transmitted in a step 106.

At the end of the step 106, the sending of the message is completed. The transmission attempt has succeeded. The priority management method is once again executed by the network interface 40 to send another message. The priority management method is repeated by each network interface 40 so long as they have messages to send over the physical layer 26.

However, if, during the detection step 104, the internal state of the data link layer does not allow the message to be sent, during a waiting step 108, the network interface 40 will wait for the internal state of the data link layer to be in a priority state lower than or equal to the priority level of the message before attempting to transmit the message. Then, the message may be transmitted following a random waiting time T_RAND so as to reduce collisions between multiple messages having the same priority during a step 116.

During the waiting step 108, the internal state of the data link layer develops. Each time the data link layer enters the receiving state, if the waiting message could not be sent during the step 116, the priority of the waiting message(s) is increased in a step 112, unless the priority level of the waiting messages is already at the maximum, or if the priority level of the message being received is at the maximum. Then, the method returns to the waiting step 108.

A waiting period T begins at the start of the step 108 and ends once the message is sent. During this waiting period T, the method may return one or more times to the step 108.

Thus, because the priorities are almost systematically increased, a waiting message will ultimately have a higher priority than the other messages, and can be sent on a priority basis.

However, no new message having a maximum priority level is created until all messages having the maximum priority level have been transmitted, which allows for priority transmission of the messages having the maximum priority level.

The priority of the message being received that occupies the physical layer is reduced from the internal state of the data link layer at the time the message is received.

Once the message has been transmitted, the method then restarts at step 100. The data link layer then enters the buffer state.

Thus, by managing the priority of the messages sent by the communicating devices on the physical links 26 within the subnets, it is possible to limit the risk of a communicating device not being able to send messages due to saturation of the physical link 26.

The embodiments and variants discussed above may be combined to generate new embodiments.

The invention claimed is:

1. A method for managing traffic on a communications network, the method being executed by a network interface of a communicating device when transmitting a message over a physical link of the communications network, the network interface being configured to implement a protocol stack, the method being executed in a data link layer of the protocol stack, the data link layer receiving different internal states, the message comp including a transmission priority level defined by a priority value having a lowest value indicating a maximum priority and a highest value indicating a minimum priority, the method comprising:
  detecting one of the internal states of the data link layer;
  in a condition in which the internal state of the data link layer does not allow the message to be sent immediately:
    waiting for a waiting period until the internal state of the data link layer transitions to a priority state lower than or equal to the message transmission priority level, and
    increasing the message transmission priority level by one unit each time the internal state of the physical link returns to an engaged state in which a signal is present on the physical link during the waiting period; and
  sending the message on the physical link when the internal state of the data link layer transitions to the priority state lower than or equal to the message transmission priority level.

2. The method of claim 1, wherein the data link layer successively enters various internal states:
  an engaged or receiving state during an engaged period, during which a carrier signal is present on the physical link,
  a buffer state following an end of the engaged state of the physical link, for a predetermined period,
  a maximum priority state,
  intermediate priority states, and
  a minimum priority state,
  wherein a duration of the priority states is predetermined or ends with a new engaged state.

3. The method of claim 1, wherein the protocol stack comprises
  a physical layer configured to manage physical signals carrying message data on the physical link,
  the data link layer that is configured to transfer data via the communications network interfaces, and
  a network layer to exchange and transmit messages within the communications network.

4. The method of claim 3, wherein a data frame generated on the data link layer contains data to be transmitted, the data to be transmitted encapsulating a network packet associated with one of the layers of the protocol stack,
  wherein the method further comprises preparing the message to be sent by initializing a transmission priority value of the data frame with a value equal to a reference priority value of the network packet that is a function of a type of communicating device that is transmitting the message or of a predefined criticality of the message.

5. The method of claim 1, wherein the priority value is a numerical value encoded in binary form within a dedicated field of a header of the message, the numerical value being contained within a closed interval of 0-9.

6. The method according to claim 1, further comprising reinitializing a transmission priority value of the data frame based on a reference priority value of a network packet following each transmission of the network by the network interface.

7. The method of claim 1, wherein, when sending the message over the physical link, in a condition in which the internal state of the data link layer transitions to the priority state lower than or equal to the message transmission priority level, the transmission comprises a random wait time between the transition of the internal state of the data link layer to the priority state lower than or equal to the message transmission priority level and sending the message.

8. A network interface configured to execute the traffic management method of claim 1 at each attempt to transmit the message over the physical link,
  wherein the network interface for the communicating device that is in a home automation system including the communications network having at least one physical link connects a plurality of communicating devices within the communications network.

9. A communicating device comprising:
  the network interface according to claim 8.

10. A home automation system for a building, said home automation system comprising:
  a plurality of the communicating devices according to claim 9, said communicating devices being distributed within the building, and
  the communications network to which the communicating devices are connected by physical links, the communications network permits permitting communications between the communicating devices according to a predefined communications protocol.

11. The home automation system of claim 10, wherein the communications network includes a plurality of sub-networks, each of the sub-networks containing communicating devices that are interconnected within the sub-networks by physical links.

12. The home automation system of claim 10, wherein the communications protocol is an IP protocol.

13. The home automation system of claim 10, wherein the physical link is a wired multipoint data bus link.

14. A building equipped with the home automation system according to claim 10.

15. The building of claim 14, wherein the building comprises several zones, each sub-network being associated with one of the zones of the building, each of the sub-networks containing at least one of the communicating devices.

16. The method of claim 2, wherein the protocol stack comprises
- a physical layer configured to manage physical signals carrying message data on the physical link,
- the data link layer that is configured to transfer data via the communications network interfaces, and
- a network layer to exchange and transmit messages within the communications network.

17. The method of claim 2, wherein the priority value is a numerical value encoded in binary form within a dedicated field of a header of the message, the numerical value being contained within a closed interval of 0-9.

18. The method of claim 3, wherein the priority value is a numerical value encoded in binary form within a dedicated field of a header of the message, the numerical value being contained within a closed interval of 0-9.

19. The method of claim 4, wherein the priority value is a numerical value encoded in binary form within a dedicated field of a header of the message, the numerical value being contained within a closed interval of 0-9.

20. The method of claim 2, wherein, when sending the message over the physical link, in a condition in which the internal state of the data link layer transitions to the priority state lower than or equal to the message transmission priority level, the transmission comprises a random wait time between the transition of the internal state of the data link layer to the priority status state lower than or equal to the message transmission priority level and sending the message.

* * * * *